June 4, 1963   F. G. FREEMAN   3,092,035
FLUID PUMPS OR MOTORS
Filed Feb. 15, 1960
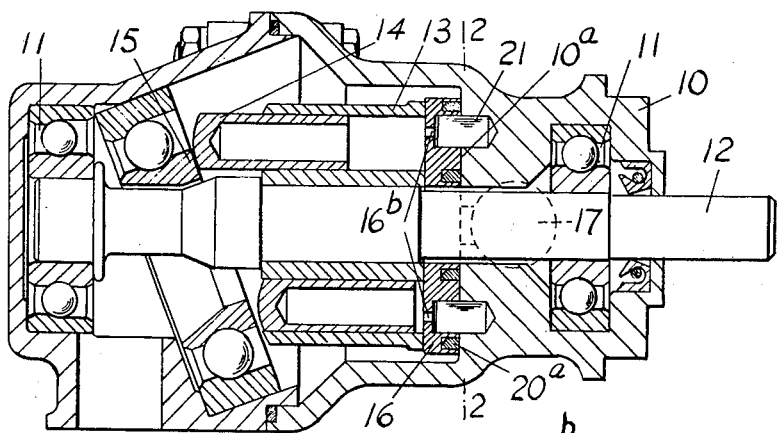
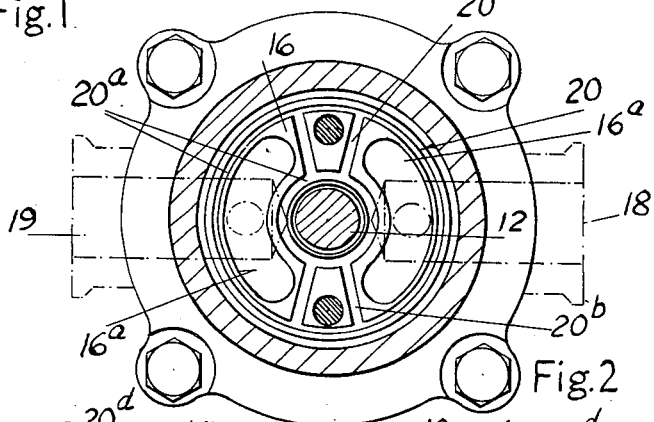
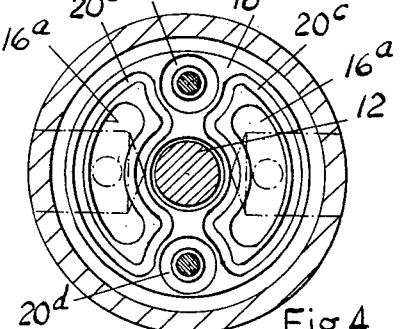
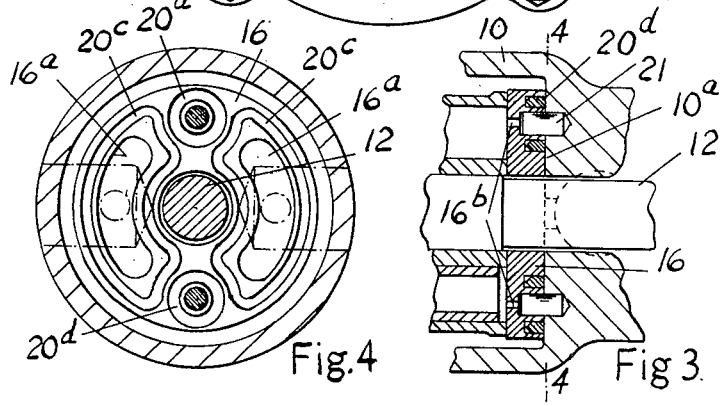
Inventor
F. G. Freeman
By Glascock Downing Seebold
Attys.

United States Patent Office 3,092,035
Patented June 4, 1963

3,092,035
FLUID PUMPS OR MOTORS
Frank George Freeman, Solihull, England, assignor to Joseph Lucas (Industries) Limited, Birmingham, England
Filed Feb. 15, 1960, Ser. No. 8,594
Claims priority, application Great Britain Feb. 20, 1959
2 Claims. (Cl. 103—162)

This invention relates to fluid pumps or motors of the kind comprising a casing having an inlet and an outlet, a rotary body part in the casing in which is formed at least one eccentrically disposed cylindrical bore, a plunger in the or each bore, a swash plate in the casing for co-operation with the plunger or plungers, and a valve plate disposed within the casing between the body part and the inlet and outlet, said valve plate having a pair of arcuately shaped apertures for controlling the admission of fluid to, and the discharge of fluid from the bore or bores in the body part.

The object of the invention is to provide such a pump or motor in a convenient form.

According to the invention in a pump or motor of the kind specified a pair of holes extend through the valve plate at diametrically opposite positions between the adjacent ends of the apertures respectively, and between the valve plate and the adjacent part of the casing is disposed a resilient sealing member or members which is/are shaped to bound four areas of the valve plate in which the two apertures and the two holes are formed respectively, said member or members being located within complementarily shaped grooves in the face of the plate or casing.

An example of the invention as applied to a liquid fuel pump for an internal combustion engine will now be described with reference to the accompanying drawings in which:

FIGURE 1 is a sectional side view of one embodiment of the invention.

FIGURE 2 is a section on the line 2—2 of FIGURE 1.

FIGURE 3 is a fragmentary sectional view similar to FIGURE 1 showing a modification, and FIGURE 4 is a section on the line 4—4 of FIGURE 3.

Referring first to the embodiment shown in FIGURES 1 and 2 there is provided a casing 10 in opposite ends of which are mounted anti-friction bearings 11 for supporting an axially extending shaft 12. At one end this shaft extends from the casing for connection to a part of the engine whereby it may be driven. On a portion of the shaft within the casing is mounted a rotary cylindrical body part 13 in which is formed at least one, but preferably a plurality of eccentric and angularly spaced cylindrical bores. In each bore is a plunger 14 which at one end is adapted to bear against a swash plate 15 mounted in the casing at a fixed angle. The swash plate 15 takes the form of an anti-friction thrust bearing the outer race of which is mounted within a recess in the casing whilst the inner race forms an abutment for the plungers.

Between the opposite end of the body part 13 and a flat transverse surface 10a of the casing is an annular valve plate 16 in which are formed a pair of arcuate apertures 16a. These apertures are arranged on a circle concentric with the shaft so that the bores in the body part 13 will register in turn with the apertures as the body part rotates. Also there are formed in the surface 10a of the casing a pair of ports 17 which are in communication respectively with an inlet 18 and an outlet 19 at opposite sides of the casing, these ports 17 being in register with the apertures 16a in the plate.

Between the plate and the said surface of the casing is a rubber or other resilient sealing member 20. The member 20 includes a pair of concentric rings 20a which are arranged concentrically around the shaft and lie at the inner and outer sides of the apertures 16a in the disc respectively, and two pairs of diametrically opposite parts 20b integrally joining the two rings at positions between the apertures. The adjacent face of the plate 16 is provided with complementary shaped grooves to receive a portion of the member 20 and thereby locate it against lateral movement. The faces of the member adjacent the base of the grooves are formed to a V-cross-section, but the depths of the grooves are such that a portion of the thickness of the member 20 is proud of the face in which the grooves are formed so as to bear on the adjacent surface of the casing 10. Moreover, at positions between the pairs of parts 20b respectively a pair of holes 16b extend through the valve plate. The holes 16b are of stepped cylindrical form with their wide ends presented to the surface 10a, and located within the wider parts of the holes and within complementary blind holes in the surface 10a are a pair of loosely fitting dowels 21 which serve to locate the plate 16 against lateral or angular movement relative to the casing 10, whilst permitting fluid flow through the holes 16b.

In the modification illustrated in FIGURES 3 and 4 the seal is formed as two pairs of separate sealing members with complementary grooves in the plate 16.

One pair of members 20c surround the apertures 16a respectively, whilst the other pair of members 20d surround the holes 16b respectively.

In further modifications the grooves may be formed in the surface 10a and the sealing member or members located therein may be against the adjacent face of the plate 16.

In use the plungers 14 are moved in one axial direction by the pressure of fuel fed to the inlet 18, and are moved in the opposite direction to discharge fuel to the outlet 19 by their interaction with the swash plate 15. During this operation the resilient member 20 or members 20c, 20d serve as a seal between the disc 16 and the casing 10. Moreover, as a bore moves from a position in register with one aperture 16a to a position in register with the other it registers with one of the holes 16b in the disc and thereby permits equalisation of the fluid pressure at opposite sides of the valve plate 16 in the areas bounded by the adjacent pair of parts 20b and the two rings 20a of the sealing member 20, or by the member 20d.

Although the invention has been described in its application to a fuel pump, it will be appreciated that it could equally well be applied to pumps for other purposes, or to fluid actuated motors of the swash plate type. Moreover, the sealing member, or members could be of any other shape which will bound and separate four areas of the valve plate which incorporate the two apertures and the two holes respectively.

Having thus described my invention what I claim as new and desire to secure by Letters Patent is:

1. A device of the kind specified, comprising in combination a casing provided at one end with a fluid inlet and a fluid outlet, a rotary cylindrical body part mounted within the casing with one end adjacent the said end of the casing, and provided with at least one cylindrical bore which extends longitudinally through the body part in spaced relationship to the axis thereof, a swash plate mounted within the casing adjacent the other end of the body part, a plunger slidably supported within the bore in the body part, and extending from the last-mentioned end of the latter for co-operation with the swash plate, a valve plate non-rotatably mounted within the casing between the first mentioned end thereof and the adjacent end of the body part, and provided at opposite sides respectively of the axis of the body part with a pair of arcuate apertures which communicate respectively with the fluid inlet and the fluid outlet, and which have a common centre of curvature coaxial with the body part so that, during rotation of the latter, the bore therein communicates alternately with the said apertures for controlling admission of fluid to, and discharge of fluid from, the said bore, the valve plate being also provided with a pair of holes which extend therethrough at diametrically opposite positions, relative to the axis of the body part, between the adjacent ends of the arcuate apertures respectively, and which, when in communication with the bore in the body part, enable fluid pressure within the said bore to act in opposite directions on the valve plate, and resilient sealing means arranged between the valve plate and the adjacent end of the casing, and shaped to bound the four areas in the valve plate in which the arcuate apertures and the holes are respectively formed, the sealing means being located within complementarily shaped grooves in one of the adjacent surfaces of the valve plate and casing.

2. A device according to claim 1, and having a pair of loosely fitting dowels located within blind holes in the first mentioned end of the casing, and extending respectively into the adjacent end portions of the holes in the valve plate for preventing movement of the latter in the plane occupied thereby, the holes in the valve plate being of stepped cylindrical form, and each consisting of two parts which are of different diameters and are separated by a shoulder, and into the wider part of which the corresponding dowel extends with the adjacent end thereof spaced from the said shoulder.

References Cited in the file of this patent

UNITED STATES PATENTS

| | | |
|---|---|---|
| 2,250,031 | Nathan | July 22, 1941 |
| 2,506,974 | Sorensen | May 9, 1950 |
| 2,620,736 | Overbeke | Dec. 9, 1952 |
| 2,813,493 | Aspelin | Nov. 19, 1957 |